(12) United States Patent
Annunziato

(10) Patent No.: US 8,509,858 B2
(45) Date of Patent: Aug. 13, 2013

(54) SOURCE DEPENDENT WIRELESS EARPIECE EQUALIZING

(75) Inventor: Kevin P. Annunziato, Medway, MA (US)

(73) Assignee: Bose Corporation, Framingham, MA (US)

( * ) Notice: Subject to any disclaimer, the term of this patent is extended or adjusted under 35 U.S.C. 154(b) by 48 days.

(21) Appl. No.: 13/271,850

(22) Filed: Oct. 12, 2011

(65) Prior Publication Data
US 2013/0095884 A1 Apr. 18, 2013

(51) Int. Cl.
*H04M 1/00* (2006.01)
*H03G 5/00* (2006.01)

(52) U.S. Cl.
USPC ........................ 455/569.1; 381/103

(58) Field of Classification Search
USPC ............ 455/569.1, 570, 73, 135, 222, 226.3, 455/296; 381/74, 103; 379/420.01, 420.02, 379/420.03, 420.04
See application file for complete search history.

(56) References Cited

U.S. PATENT DOCUMENTS

| | | | |
|---|---|---|---|
| 6,339,696 B1 | 1/2002 | Chan et al. | |
| 7,383,175 B2* | 6/2008 | Doran et al. | 704/207 |
| 7,558,390 B2* | 7/2009 | Nielsen et al. | 381/103 |
| 7,668,968 B1 | 2/2010 | Smith | |
| 2004/0252718 A1 | 12/2004 | Miyamoto | |
| 2005/0157783 A1 | 7/2005 | Ota | |
| 2006/0245379 A1 | 11/2006 | Abuan et al. | |
| 2007/0110256 A1* | 5/2007 | Slevin et al. | 381/74 |
| 2007/0245028 A1 | 10/2007 | Baxter et al. | |
| 2008/0112572 A1* | 5/2008 | Wong et al. | 381/74 |
| 2008/0242281 A1 | 10/2008 | King | |
| 2009/0060225 A1 | 3/2009 | Lydon et al. | |
| 2009/0181641 A1 | 7/2009 | Fiatal | |
| 2009/0185792 A1 | 7/2009 | Braunstein et al. | |
| 2009/0189981 A1 | 7/2009 | Siann et al. | |
| 2009/0252350 A1 | 10/2009 | Seguin | |
| 2009/0310520 A1 | 12/2009 | Yang et al. | |
| 2010/0002580 A1 | 1/2010 | DelRegno et al. | |
| 2010/0029337 A1 | 2/2010 | Kuhl et al. | |
| 2010/0037283 A1 | 2/2010 | Zhu | |
| 2010/0178910 A1 | 7/2010 | Holm et al. | |
| 2010/0219012 A1 | 9/2010 | Baumbach | |
| 2010/0235891 A1 | 9/2010 | Oglesbee et al. | |
| 2010/0254551 A1 | 10/2010 | Aoki et al. | |
| 2011/0222701 A1* | 9/2011 | Donaldson et al. | 381/74 |

FOREIGN PATENT DOCUMENTS

| | | |
|---|---|---|
| GB | 2466824 A | 7/2010 |
| JP | 63-01182 A | 1/1988 |

OTHER PUBLICATIONS

International Search Report and the Written Opinion of the International Searching Authority dated Dec. 21, 2012 for PCT/US2012/059643.

* cited by examiner

*Primary Examiner* — Sonny Trinh
(74) *Attorney, Agent, or Firm* — Bose Corporation

(57) ABSTRACT

A headphone for use with a wireless audio device. The headphone determines whether the origin of an incoming transmission is a cell phone or a device such as a land line device or a computer. The headphone applies a different equalization pattern depending on whether the origin is a land line device or a computer or whether the origin is a cell phone. The headphone may measure the amplitude of the incoming transmission above a first threshold frequency, or below a second threshold frequency, or both to determine if the origin is a land line device or a computer or if the origin is a cell phone.

16 Claims, 3 Drawing Sheets

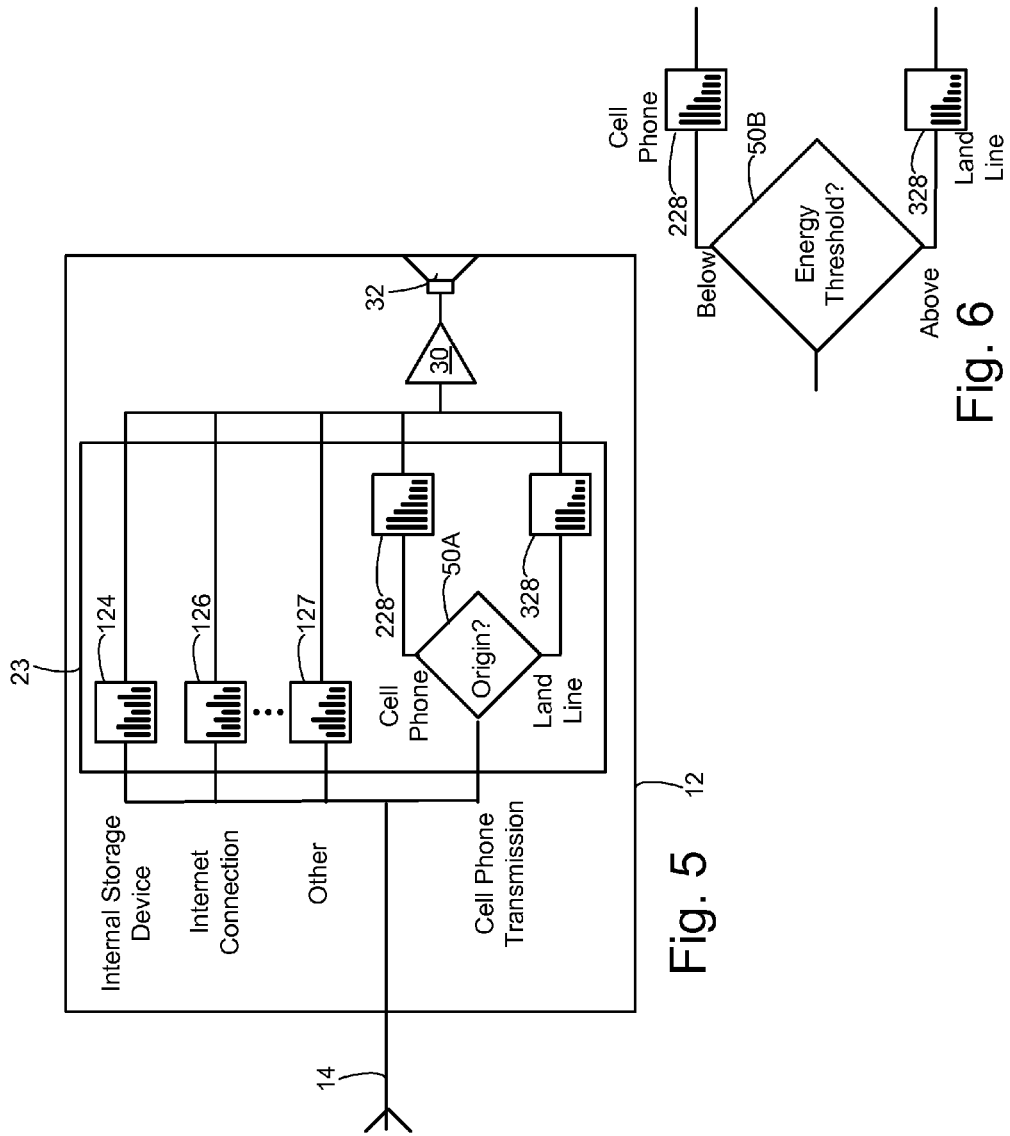

SOURCE DEPENDENT WIRELESS EARPIECE EQUALIZING

BACKGROUND

This specification describes a headphone used with a wireless audio device. The headphone determines whether the origin of an incoming transmission is a cell phone or a device such as a land line device or a computer. The headphone applies a different equalization pattern depending on whether the origin is a land line device or a computer or whether the origin is a cell phone. The headphone may measure the amplitude of the incoming transmission above or below a threshold frequency to determine if the origin is a land line device or a computer or if the origin is a cell phone.

SUMMARY

In one aspect, a headphone includes a first receiver for wirelessly receiving incoming cell phone transmissions from an electronic device including a cell phone; a transducer for transducing the cell phone transmission to acoustic energy; circuitry for determining whether the origin of the cell phone transmission is a cell phone, a land line device, or a computer; circuitry for applying, in the event that the origin of the cell phone transmission is a cell phone, a first equalization pattern to the incoming cell phone transmission; and circuitry for applying, in the event that the origin of the cell phone transmission is a land line device or a computer, a second equalization pattern, different from the first equalization pattern, to the incoming cell phone transmission. The circuitry for determining whether the origin of the cell phone transmission is a cell phone, a land line device, or a computer may include circuitry for measuring the amplitude of the audio signal above a first threshold frequency or below a second threshold frequency, or both. The second equalization pattern may boost the frequencies below a threshold frequency more than the first equalization pattern. The second equalization pattern may boost the frequencies above a threshold frequency more that the first equalization pattern. The first receiver may be further for wirelessly receiving incoming transmissions of non-cellphone audio signals from an audio device and the headphone may further include circuitry for applying a third equalization pattern, different from the first equalization pattern and the second equalization pattern. The headphone may further include a second receiver for wirelessly receiving incoming transmissions from a wireless communications network. The headphone may further be for wirelessly receiving incoming transmissions from a wireless communications network. The headphone may further include circuitry for receiving incoming transmissions through a physical transmission medium. The headphone of claim may be an in-ear earpiece.

In another aspect, a headphone includes a first receiver for wirelessly receiving incoming cell phone transmissions from an electronic device including a cell phone; a transducer for transducing the cell phone transmission to acoustic energy; circuitry for measuring the amplitude of the audio signal above a first threshold frequency or below a second threshold frequency or both; circuitry for applying, in the event that the amplitude of the audio signal above the first threshold frequency, or below the second threshold frequency, or both, is below a corresponding threshold amplitude, a first equalization pattern to the incoming cell phone transmission; and circuitry for applying, in the event that the amplitude of the signal above the first threshold frequency and below the second threshold frequency is above the corresponding threshold amplitudes, a second equalization pattern, different from the first equalization pattern, to the incoming cell phone transmission. The headphone may further be for wirelessly receiving incoming transmissions of non-cellphone audio signals that from an audio device, and the headphone may further include circuitry for applying a third equalization pattern, different from the first equalization pattern and the second equalization pattern. The headphone may further include a second receiver for wirelessly receiving incoming transmissions from a wireless communications network. The first receiver may further be for wirelessly receiving incoming transmissions from a wireless communications network. The headphone may further include circuitry for receiving incoming transmissions through a physical transmission medium. The headphone may be an in-ear earpiece.

In another aspect, a method for operating a headphone includes wirelessly receiving an incoming cell phone transmission; determining whether the origin of the cell phone transmission is a cell phone or is a land line device or a computer; in response to the origin of the incoming cell phone transmission being a cell phone, applying first equalization pattern to the incoming cell phone transmission; in response to the origin of the incoming cell phone transmission being a land line device or a computer, applying a second equalization pattern, different from the first equalization pattern, to the incoming cell phone transmission. The method may include measuring the amplitude of the audio signal above a first threshold frequency or below a second threshold frequency, or both; in response to the amplitude above the first threshold frequency, or below the second threshold frequency, or both, being below a threshold amplitude, determining that the origin of the incoming cell phone transmission is a cell phone; and in response to the frequency content above the first threshold frequency or below the threshold frequency being above a threshold amplitude, determining that the origin of the incoming cell phone transmission is a land line device or a computer.

In another aspect, a method for operating a headphone may include wirelessly receiving an incoming cell phone transmission; measuring the amplitude of the audio signal in the cell phone transmission above a first threshold frequency or below a second threshold frequency, or both; in response to the amplitude above the first threshold frequency, or below the second threshold frequency or both, being below a threshold amplitude, applying a first equalization pattern to the incoming cell phone transmission; and in response to the amplitude above the first threshold frequency and below the threshold frequency being above the threshold amplitude, applying a second equalization pattern, different from the first equalization pattern, to the incoming cell phone transmission.

Other features, objects, and advantages will become apparent from the following detailed description, when read in connection with the following drawing, in which:

BRIEF DESCRIPTION OF THE SEVERAL VIEWS OF THE DRAWING

FIG. 5 is a block diagram of a process for improving audio quality of cell phone transmissions; and FIG. 6 shows an alternative to one of the blocks of FIG. 5.

DETAILED DESCRIPTION

Figure 1A:
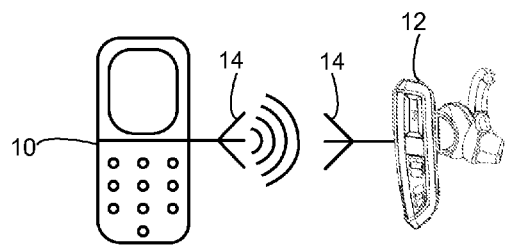
FIG. 1A is a diagrammatic view of a wireless audio device and an earpiece.

Though the elements of several views of the drawing may be shown and described as discrete elements in a block diagram and may be referred to as "circuitry", unless otherwise indicated, the elements may be implemented as one of, or a combination of, analog circuitry, digital circuitry, or one or more microprocessors executing software instructions. The software instructions may include digital signal processing (DSP) instructions. Operations may be performed by analog circuitry or by a microprocessor executing software that performs the mathematical or logical equivalent to the analog operation. Similarly, "logic" may refer to logic elements such as AND gates, OR gates and the like, or may refer to microprocessors executing software instructions, or may also refer to analog circuitry performing equivalent functions. Activities performed by logic may be performed by digital circuit elements, by microprocessors executing software instructions, or by analog circuitry. Unless otherwise indicated, signal lines may be implemented as discrete analog or digital signal lines, as a single discrete digital signal line with appropriate signal processing to process separate streams of audio signals, or as elements of a wireless communication system. Some of the processes may be described in block diagrams. The activities that are performed in each block may be performed by one element or by a plurality of elements, and may be separated in time. The elements that perform the activities of a block may be physically separated. Unless otherwise indicated, audio signals or video signals or both may be encoded and transmitted in either digital or analog form; conventional digital-to-analog or analog-to-digital converters may not be shown in the figures. "Headphone", as used herein includes earpieces which fit in or on one ear or both ears and devices which have two earphones which fit on or around both ears and may or may not include a microphone.

FIG. 1A shows a wireless audio device 10 and an earpiece 12. The wireless audio device 10 may be a "smart" cell phone that is designed to function not only as a cell phone but also as a mobile computer capable of wirelessly communicating data, and may also be designed to function as a media storage device, capable of storing and reproducing for example, music, verbal information such as recorded books or spoken material, or multimedia information, such as videos. The wireless audio device 10 and the earpiece 12 communicate wirelessly (as represented by antennas 14, for example using the Bluetooth® wireless communication protocol). The communications may be one way, from the wireless audio device 10 to the earpiece 12, or two way. The wireless audio device 10 may have components for performing non-audio functions, for example a microprocessor for running computer "apps" and/or visually displaying data and permitting manipulation of the data.

Figure 1B:
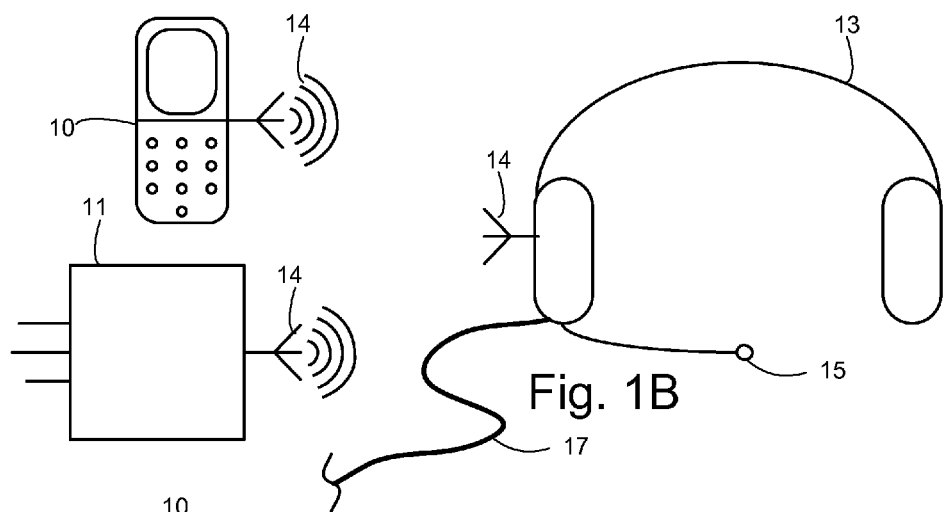
FIG. 1B is a diagrammatic view of a wireless audio device, a wireless communications device, and a physical communications link

FIG. 1B shows two wireless devices 10 (for example a cell phone), 11 (for example a wireless communications network or a radio broadcast), and a headphone 13 which may include a microphone 15. In addition to communicating wirelessly with wireless devices 10, 11, the headphone may also communicate through a physical communications link 17 (for example to a communications system on an aircraft).

Figure 2:
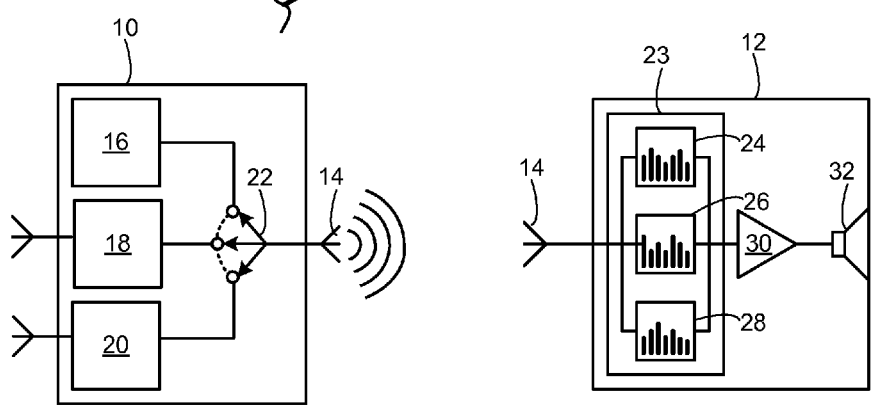
FIG. 2 is a diagrammatic view of wireless audio device with and an earpiece in block diagram form.

FIG. 2 shows the wireless audio device 10 and the earpiece 12 in block diagram form, with additional detail. The audio device 10 includes an internal storage device 16, a data receiver to receive audio signals wirelessly, for example from the internet, as represented by block 18, and a cell phone receiver to receive cell phone transmissions as represented by block 20. The data receiver and the cell phone receiver may share some or all components. There may be additional terminals, for example, for battery charging devices, universal serial bus (USB) ports or other ports for disconnectable attachments, not shown.

The wireless audio device 10 of FIG. 1A may have circuitry, represented in FIG. 2 by switch 22 for selecting signals from one of the internal storage device 16, the internet block 18, or the cell phone block 20 (or another audio signal source) for wireless transmission to the earpiece 12. The switch may be a user operable physical or virtual switch, or may be logic that selects a source based on a hierarchy or by a computer program executed by a microprocessor in the wireless audio device 10.

Similarly the wireless audio device 10 of FIG. 1B may have circuitry, represented in FIG. 2 by switch 22 for selecting signals from one of the internal storage device 16, the internet block 18, or the cell phone block 20 (or another audio signal source) for wireless transmission to the headphone 13. The switch may be a user operable physical or virtual switch, or may be logic that selects a source based on a hierarchy or by a computer program executed by a microprocessor in the wireless audio device 10. The headphone of FIG. 1B may also have circuitry, not shown, for selecting signals from one of the wireless audio device 10, wireless audio device 11, or physical communications link 17 for reproduction. The discussion below is directed to the implementation of FIG. 1A; however the same principles may to the implementation of FIG. 1B In operation, audio signals from a selected source are wirelessly transmitted from the audio device 10 to the earpiece 12. The earpiece 12 transduces the audio signals to acoustic energy, which is radiated through the earpiece into the ear of a user.

In addition to communicating the audio signals from the audio device to the earpiece, the audio device may also communicate data that identifies the source of the audio signals. The earpiece applies audio signal processing as represented by block 23 to the audio signals. Some of the processing may be specific to the type of audio signals. For example, the processing may include different equalization (EQ) patterns depending on the type of audio signal, as represented by EQ blocks 24, 26, and 28. The equalized audio signals may then be amplified or attenuated, as represented by amplifier 30 and transduced to acoustic energy, as represented by acoustic driver 32.

Figure 3:
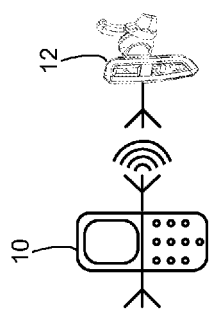
FIG. 3 is a diagrammatic view of a wireless audio device and a wireless communications network.

FIG. 3 illustrates audio device 10 and earpiece 12, with additional components of the network for transmitting cell phone audio signals. The cell phone audio signal are transmitted to the audio device 10 by a cell phone network, represented by cell phone tower 34. The origin of the cell phone transmission may be either a cell phone 36, a "land line" device (that is a device such as a telephone that 38 that is connected to a network by a physical communication link 40, for example electrically conductive wire or optical fiber, then communicated to the cell phone network), a computer 39 (including laptop, notepad, or handheld computers) that may be connected to a network either by physical communications link 40 or wirelessly as indicated by antenna 14 and which communicates audio or audio-visual data. FIG. 3 is a simplified diagram that shows some, but not necessarily all, of the intervening devices between the origin of the audio signals and the earpiece 12.

Figure 4:
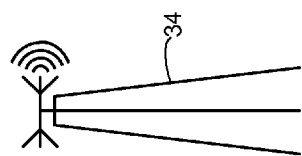
FIG. 4 is a plot of frequency vs. signal amplitude for two types of wireless transmissions.
Figure 4:
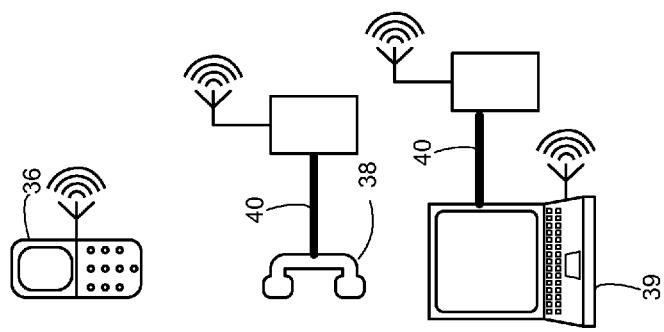
Figure 4:
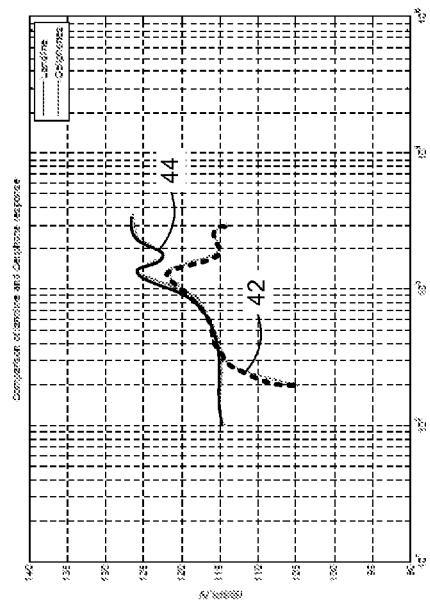

Conventionally, the data available to the earpiece 12 can identify the source of the audio signals as a cell phone transmission, but does not differentiate between a cell phone transmission whose origin is a cell phone or a land line device or a computer. The earpiece therefore applies the same EQ pattern to incoming cell phone audio signals regardless of whether the origin of the audio signals is a cell phone or a land line device. This may have undesirable results. As shown in FIG. 4, incoming cell phone transmissions originating with cell phones may have different frequency content than incoming cell phone transmissions originating with land lines or computers. Curve 42 of FIG. 4 represents the frequency response of an exemplary cell phone transmission originating from a cell phone. Curve 44 of FIG. 4 represents the frequency response of an exemplary cell phone transmission originating from a land line device. Curve 42 has a steep low frequency roll off beginning at about 300 Hz while the curve 44 is substantially flat from 300 Hz to 100 Hz. At 200 Hz, the low frequency dB SPL/V is about 10 dB less for curve 42 than for curve 44. Therefore, if an EQ pattern appropriate to achieve a desired frequency response for a transmission originating from a cell phone is applied to a transmission originating from a land line device, there may be excessive boost to the frequencies below about 300 Hz, so that there may be excessive bass, and the audio may sound "boomy" or "muddy". If an EQ pattern appropriate for a transmission originating from a land line is applied to a transmission originating from a cell phone, there may be insufficient bass, and the audio may sound "thin" or "tinny". The high frequency content of curve 42 may be less than the high frequency content of curve 44. For example, at about 1500 Hz, the high frequency dB SPL/V of curve is about 5 dB greater for curve 44 than for curve 42, and the difference may increase to 8 dB at 2 kHz and to 12 dB at 3 kHz. If an EQ pattern appropriate to achieve a desired frequency response for a transmission originating from a cell phone is applied to a transmission originating from a land line device, there may be excessive boost to the frequencies above about 1 kHz. If an EQ pattern appropriate for a transmission originating from a land line is applied to a transmission originating from a cell phone, there may be insufficient frequency content above about 1 kHz. Since the 1 kHZ to 3 kHz frequency band is an important part of the speech band, excessive or inadequate frequency content in the 1 kHZ to 3 kHz frequency band may adversely affect intelligibility of speech.

FIG. 5 shows a method for improving audio quality of cell phone transmissions that are received by earpiece 12. In the earpiece of FIG. 5, different equalization patterns 124, 126, and 128 are applied to audio signals that are received from an internal storage device (16 of FIG. 12), an internet connection (for example 18 of FIG. 2), or another device, respectively. If the wirelessly received data is a cell phone transmission, an additional step is performed, as represented by block 50A. At block 50A, the earpiece determines whether the origin of the incoming cell phone transmission is a cell phone or a land line device. If the origin of the incoming cell phone transmission is a cell phone, the audio processing block 23 applies an equalization pattern appropriate for a cell phone originated frequency response. If the origin of the incoming cell phone transmission is a land line device, the audio processing block 23 applies an equalization pattern appropriate for a land line device originated frequency response. Typically, the equalization pattern for the cell phone originated frequency response would have more boost in the bass region (particularly below 200 Hz) than the equalization pattern for a land line device frequency response.

The operations of FIG. 5 are typically performed by a digital signal processor (DSP).

Sometimes, an indication of the origin of the incoming cell phone is not present in the transmission itself. In other cases, cell phone originated incoming cell phone calls may have the frequency content typical of land line originated incoming cell phone calls, or incoming land line originated cell phone calls may have the frequency content more typical of cell phone originated cell phone calls. Some of the factors that affect the frequency content of incoming cell phone calls include the capabilities of devices (for example, microphones and routers) in the transmission path, bandwidth of internet connections, and software that processes the audio signals along the transmission path FIG. 6 shows an alternative to the operation of block 50A of FIG. 5 that applies an appropriate EQ pattern if the origin is unidentified or even misidentified, or the incoming cell phone transmission has a atypical frequency response (for example, a land line originated cell phone transmission has a frequency content typical of a cell phone originated cell phone transmission). At block 50B, the amplitude of the audio signal above or below a frequency threshold, for example below 200 Hz or above 2 kHz, is determined. The amplitude of the audio signal may be measured by simply measuring the voltage of the analog signal, or by interpreting the digital representation of the audio signal. If the below or above threshold amplitude is less than a threshold amount, for example, −5 dBV/V or −5 dB SPL/V, the audio processing block applies an equalization pattern appropriate for a cell phone originated frequency response. If the above or below threshold frequency amplitude is greater than the threshold amount, the audio processing block 23 applies an equalization pattern appropriate for a land line device originated frequency response.

Numerous uses of and departures from the specific apparatus and techniques disclosed herein may be made without departing from the inventive concepts. Consequently, the invention is to be construed as embracing each and every novel feature and novel combination of features disclosed herein and limited only by the spirit and scope of the appended claims.

What is claimed is:

1. A headphone, comprising
   a first receiver for wirelessly receiving incoming cell phone transmissions;
   a transducer for transducing the cell phone transmission to acoustic energy;
   circuitry for determining whether the origin of the cell phone transmission is a cell phone, a land line device, or a computer;
   circuitry for applying, in the event that the origin of the cell phone transmission is a cell phone, a first equalization pattern to the incoming cell phone transmission; and
   circuitry for applying, in the event that the origin of the cell phone transmission is a land line device or a computer, a second equalization pattern, different from the first equalization pattern, to the incoming cell phone transmission
   wherein the second equalization pattern boosts the frequencies below a threshold frequency less than the first equalization pattern.

2. The headphone of claim 1, wherein the circuitry for determining whether the origin of the cell phone transmission is a cell phone, a land line device, or a computer comprises circuitry for measuring the amplitude of the audio signal above a first threshold frequency or below a second threshold frequency, or both.

3. The headphone of claim 1, wherein the second equalization pattern boosts the frequencies above a threshold frequency less that the first equalization pattern.

4. The headphone of claim 1, wherein the first receiver is further for wirelessly receiving incoming transmissions of non-cellphone audio signals from an audio device, the headphone further comprising circuitry for applying a third equalization pattern, different from the first equalization pattern and the second equalization pattern.

5. The headphone of claim 1, further comprising:
a second receiver for wirelessly receiving incoming transmissions from a wireless communications network.

6. The headphone of claim 1, wherein the first receiver is further for wirelessly receiving incoming transmissions from a wireless communications network.

7. The headphone of claim 1, further comprising circuitry for receiving incoming transmissions through a physical transmission medium.

8. The headphone of claim 1, wherein the headphone is an in-ear earpiece.

9. A headphone, comprising
a first receiver for wirelessly receiving incoming cell phone transmissions;
a transducer for transducing the cell phone transmission to acoustic energy;
circuitry for measuring the amplitude of the audio signal above a first threshold frequency or below a second threshold frequency or both;
circuitry for applying, in the event that the amplitude of the audio signal above the first threshold frequency, or below the second threshold frequency, or both, is below a corresponding threshold amplitude, a first equalization pattern to the incoming cell phone transmission; and
circuitry for applying, in the event that the amplitude of the signal above the first threshold frequency and below the second threshold frequency is above the corresponding threshold amplitudes, a second equalization pattern, different from the first equalization pattern, to the incoming cell phone transmission.

10. The headphone of claim 9, wherein the first receiver is further for wirelessly receiving incoming transmissions of non-cellphone audio signals that from an audio device, the headphone further comprising circuitry for applying a third equalization pattern, different from the first equalization pattern and the second equalization pattern.

11. The headphone of claim 9, further comprising:
a second receiver for wirelessly receiving incoming transmissions from a wireless communications network.

12. The headphone of claim 9, wherein the first receiver is further for wirelessly receiving incoming transmissions from a wireless communications network.

13. The headphone of claim 9, further comprising circuitry for receiving incoming transmissions through a physical transmission medium.

14. The headphone of claim 9, wherein the headphone is an in-ear earpiece.

15. A method for operating a headphone, comprising:
wirelessly receiving an incoming cell phone transmission;
determining whether the origin of the cell phone transmission is a cell phone or is a land line device or a computer;
in response to the origin of the incoming cell phone transmission being a cell phone, applying first equalization pattern to the incoming cell phone transmission;
in response to the origin of the incoming cell phone transmission being a land line device or a computer, applying a second equalization pattern, different from the first equalization pattern, to the incoming cell phone transmission
wherein the determining comprises measuring the amplitude of the audio signal above a first threshold frequency or below a second threshold frequency, or both;
in response to the amplitude above the first threshold frequency, or below the second threshold frequency, or both, being below a threshold amplitude, determining that the origin of the incoming cell phone transmission is a cell phone; and
in response to the frequency content above the first threshold frequency or below the threshold frequency being above a threshold amplitude, determining that the origin of the incoming cell phone transmission is a land line device.

16. A method for operating a headphone, comprising:
wirelessly receiving an incoming cell phone transmission;
measuring the amplitude of the audio signal in the cell phone transmission above a first threshold frequency or below a second threshold frequency, or both;
in response to the amplitude above the first threshold frequency, or below the second threshold frequency or both, being below a threshold amplitude, applying a first equalization pattern to the incoming cell phone transmission; and
in response to the amplitude above the first threshold frequency and below the threshold frequency being above the threshold amplitude, applying a second equalization pattern, different from the first equalization pattern, to the incoming cell phone transmission.

* * * * *